United States Patent [19]

Wood

[11] 4,382,810
[45] May 10, 1983

[54] PROGRAMMABLE SPEED CONTROLLER

[75] Inventor: Charles L. Wood, Muncie, Ind.

[73] Assignee: Ball Corporation, Muncie, Ind.

[21] Appl. No.: 281,565

[22] Filed: Jul. 8, 1981

[51] Int. Cl.³ .............................................. C03B 9/40
[52] U.S. Cl. ..................................... 65/29; 65/163;
    65/164; 65/DIG. 13; 364/473; 364/476
[58] Field of Search .................. 65/29, 162, 163, 164,
    65/DIG. 13; 364/473, 476

[56] References Cited

U.S. PATENT DOCUMENTS

| | | | |
|---|---|---|---|
| 4,007,028 | 2/1977 | Bublitz et al. | 65/163 |
| 4,145,205 | 3/1979 | Farkas et al. | 65/163 X |
| 4,152,134 | 5/1979 | Dowling et al. | 65/164 X |
| 4,162,909 | 7/1979 | Peters | 65/163 |

OTHER PUBLICATIONS

The Application of the GEM Microprocessor System to Industrial and Process Control, R. S. Webb, Jun. 1981, Glass Technology, vol. 22, No. 3, pp. 113-117.

Primary Examiner—Arthur D. Kellogg
Attorney, Agent, or Firm—Hume, Clement, Brinks, Willian & Olds

[57] ABSTRACT

A programmable control signal generator controls the overall speed of an I.S. machine, the timing of sequential functions of each individual section, and the relative phasing of the IS machine sections. A time-based drive signal, derived from the time base signal of the programmable control signal generator, is applied to a stepper motor which is coupled to a gob feeder and plunger mechanism and a conveyor mechanism through respective gear reducers. The pulse repetition rate of the drive signal is controlled manually from an operator's speed control station or automatically from a computer to establish and vary the machine speed. The programmable control signal generator also provides a timing signal, coordinated with the drive signal, to time the sequential functions of the sections as a function of the number of elapsed time increments into which a machine cycle is divided. The timing signal has a pulse repetition rate which is preferably a calculated ratio of the repetition rate of the drive signal. In addition, the programmable control signal generator provides a cycle reference signal, coordinated with the drive signal, to control phasing of the sections. The reference signal has a pulse repetition rate which is preferably a calculated ratio of the repetition rate of the timing signal.

21 Claims, 4 Drawing Figures

PROGRAMMABLE SPEED CONTROLLER

BACKGROUND OF THE PRESENT INVENTION

This invention relates to a programmable timing controller for synchronizing the operation of one or more sections of a glassware forming machine or other plural-sectioned machine with one another and with machine components common to all individual sections.

The individual section glassware forming machine ("IS machine"), which is well known in the art, comprises a plurality of individual sections. The individual sections perform sequentially timed functions in synchronism with one another in a phased relationship. Gobs of molten glass are acquired in sequence from a shear and feeder mechanism and as one of the individual sections is receiving a gob, another individual section is delivering a finished glass container to a conveyor system. At the same time, other individual sections are engaged in various functions that are intermediate between the receiving of a gob and the delivering of finished glass container to the conveyor. Such a glassware forming machine is disclosed in Ingle U.S. Pat. No. 1,911,119.

It is necessary to accurately control the timing of various IS machine operations. It is well known to time the mechanism operations common to all of the individual sections of an IS machine by a drum having cam members, called buttons, movably attached about its surface. The drum is rotated by a motor which may, also, drive the gob feeder mechanism. The cam members selectively activate valves in a valve block to control fluid pressure to cylinders which operate the various operating components of each of the individual sections of the IS machine. This arrangement is, also, disclosed in Ingle U.S. Pat. No. 1,911,119.

However, the process of positioning the cams on the timing drum to implement or modify function timing sequences is inexact, cumbersome if not dangerous and time consuming. Such a timing apparatus further to prone to mechanical wear leading to irregularities in the forming operation, resulting in unacceptable glass containers. Consequently, substantial efforts have been made to develop an electronic timing and synchronizing control system to help overcome such drawbacks. Such an automatic control system is disclosed in Quinn et al U.S. Pat. No. 3,762,907 and Kwiatkowski et al U.S. Pat. No. Re. 29,642. The control system disclosed in these patents include a machine cycle position indicating means which in the embodiments disclosed was the shaft for driving the gob shears. In addition a timing means was responsive to the cycle position indicator for generating a digital signal indicative of the machine cycle position. In the embodiments disclosed, this was a shaft encoder. Thus in the embodiments disclosed, an electro-mechanical drive system was provided. The appreciable amount of jitter experienced with the electro-mechanical shaft encoder, sometimes as high as five or ten percent, adversely effects the accuracy of the timing controller and limits the operating speed. In a recently issued U.S. Pat. No. 4,145,204 to Farkas a control system is disclosed which also includes a cycle position indicating means and a timing means responsive thereto for generating a signal indicative of the machine cycle position. In Farkas the cycle position indicating means is the inverter which drives the motors and the timing means is a signal generator which is responsive to the output of the inverter. More specifically, in Farkas, a gob feeder and distributor supplies gobs to the individual sections at a predetermined rate proportional to the frequency of the power supplied by an inverter drive. A timing circuit is responsive to the frequency of the inverter output to generate clock signals which are applied to a machine control circuit for controllably actuating the functions of an associated individual section. The timing circuit also provides a timing reset signal to initiate the machine cycle. Accordingly, the machine speed, function timing, and cycle initiation are synchornized with one another, and the gob feeder and the gob distributor are phased (with reference to the reset signal) such that a gob is distributed to the individual sections at the required times in the machine cycle. More accurate control of the machine cycle is facilitated by providing a gob detector circuit and sensor, which detect the presence of a gob at the mold. Responding to the output of the gob detector circuit, the control circuit supplies a minor correction to the section timing, if needed. The Farkas apparatus includes a plurality of drive motors which must be phased with one another.

Reference also is made to commonly assigned co-pending U.S. application Ser. No. 281,466, of Haynes et al, filed July 8, 1981 which relates to a method and apparatus for glass factory control. The present invention can be conveniently utilized with the Haynes et al apparatus which includes a programmable apparatus responsive to the frequency of an oscillator for generating a synchronous timing signal at a frequency which provides 360 pulses per machine cycle. A timing reset signal for initiating the machine cycle is derived from the timing signal. The apparatus also generates a synchronous drive signal which is applied to an inverter system for controlling the speed of respective motors (gob distributor, shear, and conveyor motors in the Haynes et al apparatus). A feedback loop from the gob distributor motor to the inverter system enables proper control and stability.

There is thus still a need for an improved timing controller adapted for use in an IS machine (or in other types of machines having sequentially timed steps) which avoids jitter contaminated timing pulses and eliminates the need for plural mechanical drive motors and sensors and sensor detection circuitry. Further, there is need for such an improved timing controller to be programmable to automatically provide a machine speed setting and to dynamically vary that setting during operation.

SUMMARY OF THE PRESENT INVENTION

The present invention improves the accuracy of a machine timing controller and increases the maximum operating speed of a machine by eliminating use of known shaft encoders which produce outputs having jitter at high operating speeds. It also avoids the need for a plurality of motors to drive the mechanical operations of a machine and the need for sensors to improve the accuracy and phasing of the various forming operations in the individual sections of an IS machine. Furthermore, the present invention is programmable.

When adapted for use in an individual section glassware forming machine (IS machine), the present invention controls the speed of the IS machine and provides for the function timing and phasing of the operations of the individual sections of the IS machine relative to one another. A stepper motor drives a shear and feeder plunger mechanism and a conveyor mechanism through respective gear reducer means. The relative speed of the shear and feeder plunger mechanism and the conveyor mechanism are predetermined and established by the respective gear reducer ratios. The speed of the stepper motor is controlled by a pulse train, referred to herein as a drive signal, from a machine timing controller. The drive signal preferably is derived from the time base of the machine timing controller, but may be supplied by a variable frequency oscillator responsive to command signals. The pulse repetition rate of the drive signal is predetermined or controlled dynamically by the command signals issuing from an operator through a computerized speed control station or from a high-level computer assigned control for supervisory tasks over the entire glassware forming factory.

Typically, the functions performed by the components of the individual sections are timed according to a machine cycle divided into 360 one degree segments. Accordingly, the machine timing controller supplies a timing signal and a phase reference (cycle) signal. The timing signal is derived from the drive signal supplied to the stepper motor and is a programmed or predetermined ratio of the repetition rate of the drive signal. The reference signal has a repetition rate which is a function of the number of degrees into which a machine cycle is divided, and in the case of an IS machine one cycle pulse is generated for every 360 timing pulses.

BRIEF DESCRIPTION OF THE DRAWINGS

Other objects, features, and advantages of the present invention will become more fully apparent from the following detailed description of the preferred embodiments, appended claims and the accompanying drawings.

In the drawings, where like numbers indicate like parts.

DETAILED DESCRIPTION OF THE PREFERRED EMBODIMENTS

Figure 1:
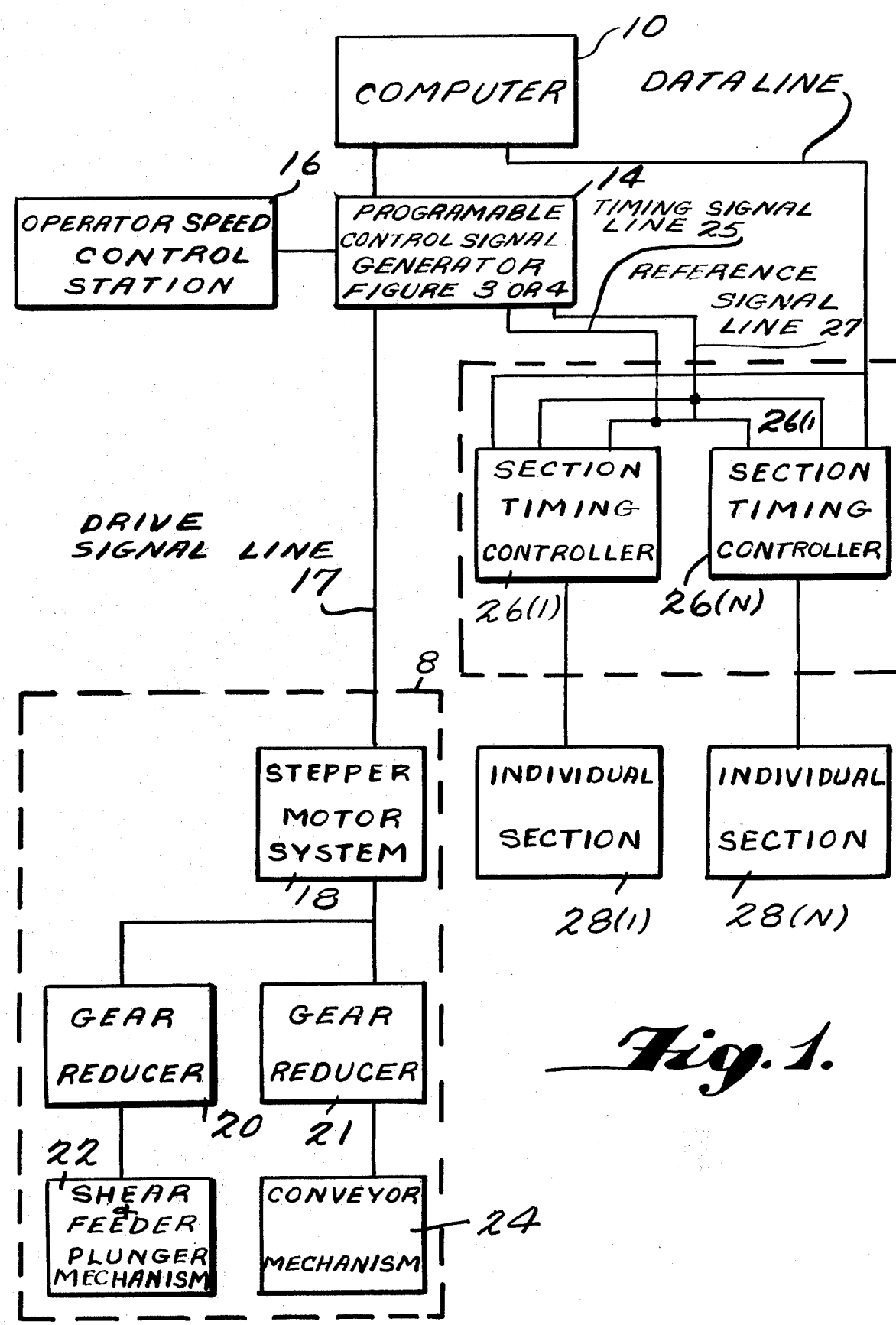
FIG. 1 is a block diagram of an exemplary embodiment of a glassware forming machine control system according to the present invention.

In the exemplary embodiment shown in FIG. 1, a programmable control signal generator 14 is responsive to instructions issued from a computer 10 and an operator speed control station 16 to provide several different types of signals for controlling the speed and function of an individual section machine (hereinafter "IS machine"). As is well known in the art, an IS machine comprises a plurality of individual sections (indicated herein by reference numeral 28(X) where X=1, 2, ..., N; and N typically varies between 6 and 10). Each individual section 28(X) cyclically performs sequential timed functions. The cycles of the individual sections are related to one another, preferably by phase angles, for regulating production from the IS machine. For example, the cycles of the individual sections of a six-sectioned IS machine are preferably all mutually separated by sixty degree phase angles. Furthermore, the function timing and section phasing are preferably synchronized with the speed of the IS machine. Accordingly, it is necessary to supply a speed control (or drive) signal, a timing signal, and a phase reference signal to the control system of the IS machine.

The control system of an IS machine according to the present invention comprises the programmable control signal generator 14 coupled to an IS machine drive 8 through drive signal line 17 and to an IS machine timing controller 12 through timing signal line 25 and reference signal line 27. In operation, "degree" settings for the various functions performed by the section and section phasing information is controllably provided to the section controller 26(X) by the computer 10 along data line 11. As is well known in the art, each function of the section 28(X) is activated at a respective predetermined degree number. The degree settings for the various functions differ for different jobs and often during the same job depending on such factors as temperature and production speed. Section phase information also is controllably provided as necessary. Once established, section phasing information infrequently changes, but is affected by production requirements (i.e., the number of sections that are in service for a particular job) and the number of sections taken out of service, for example. Control signal information is provided to the programmable control signal generator 14 by the computer 10 and the operator speed control section 16. This information establishes the frequency relationships between the time base of the programmable control signal generator 14, the drive signal, the timing signal and the reference signal as described below.

The drive signal is applied to the stepper motor system 18 of the drive 8 through drive signal line 17 to operate and control the speed of the IS machine. The stepper motor system 18 comprises a stepper motor drive unit (not shown) which drives an electro-hydraulic stepper motor (not shown). The stepper motor system 18 drives the shear and feeder plunger mechanism 22, which forms and delivers gobs to the individual sections 28(X), through gear reducer 20. The stepper motor 18 also drives the conveyor mechanism 24 (including a pusher arm mechanism and a conveyor mechanism), which removes finished ware from the respective sections 28(X) of the IS machine, through gear reducer 21. The gear reducers 20 and 21 may or may not have the same gear ratios. Shear and feeder plunger mechanisms, conveyor mechanisms, stepper motors, and gear reducers are well known in the art.

The timing signal and the phase reference signal are applied to the section controllers 26(X) through timing signal line 25 and reference signal line 27, respectively. The section controllers 26(X) are parts of electronic control systems known in the art. For example, such electronic control systems are described in U.S. Pat. No. 3,969,703, issued July 13, 1976 to Kwiatkokwski et al (now U.S. Pat. Re. 29,642), incorporated herein by reference thereto. The section controller 26(X) controls the selective activation of the various glassware forming functions executed by the section 28(X) and the phasing of the operating cycle of the section 28(X).

The section controller 26(X) preferably operates relative to a 360 degree machine cycle, although other machine intervals could, of course, be utilized. Each degree interval of the machine cycle is represented by one pulse on timing signal line 25. Not only must the functions of the section 28(X) occur at the proper degree intervals, but the operating cycles of each of the sections 28(X) comprising the IS machine must occur in a phased relationship with one another. This phased relationship allows each of the sections 28(X) to operate essentially independently of one another while sharing a common shear and feeder plunger mechanism 22 and conveyor mechanism 24. Accordingly, each section controller 26(X) responds to the reference signal with its own correspondingly predetermined phase delay in accordance with the firing order information provided by the computer 10. Phased section operation is described in greater detail in, for example, the aforementioned Kwiatkowski et al patent.

Figure 2:
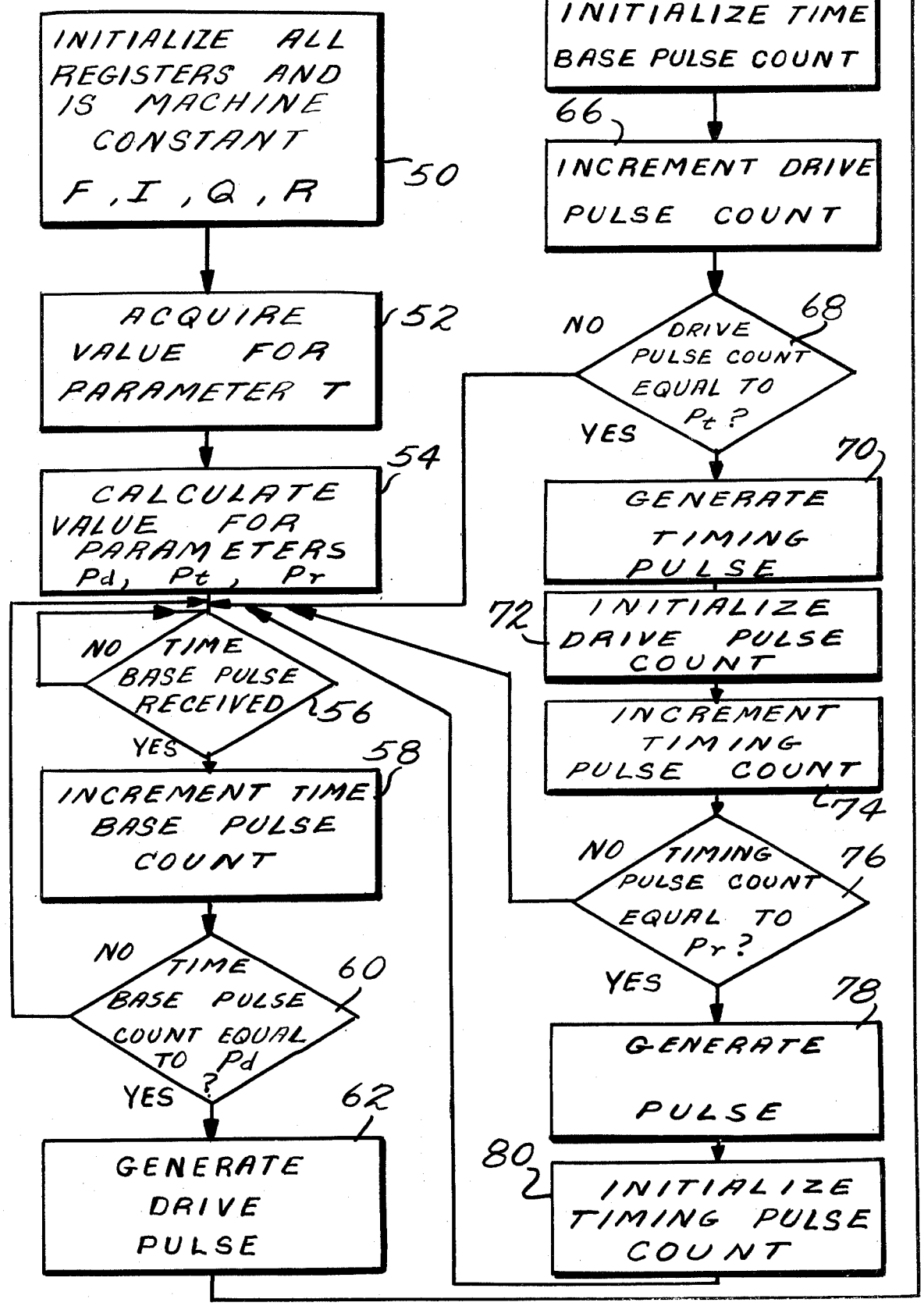
FIG. 2 is a flow diagram of a typical set of programmed steps that can be executed in a digital computer to generate suitable control signals according to the present invention.

In the presently preferred exemplary embodiment, the programmable control signal generator 14 is a programmable microprocessor capable of executing program steps such as those shown in FIG. 2. Suitable microprocessors are commercially available and include the model SBC 80/05 (Single Board Computer) manufactured by Intel Corporation. The time base of the programmable microprocessor is provided by an internal clock producing pulses having a predetermined recurrence rate. In the presently preferred exemplary embodiment, the time base pulses are counted to produce the drive signal, the drive signal pulses are counted to produce the timing signal, and the timing signal pulses are counted to produce the reference signal. The number of time base signal pulses that are counted to produce a single drive signal pulse is designated $P_D$; the number of drive signal pulses counted to generate a single timing signal pulse is designated $P_T$; and the number of timing signal pulses counted to produce a single reference signal pulse is designated $P_R$. These parameters are calculated from several known constants and a single variable. The known constants are:

F, the frequency of the time base signal;
I, the number of degree intervals per machine cycle (360 degree intervals unless otherwise specified);
Q, the number of pulses required to effect one revolution of the stepper motor system 18;
R, the gear ratio of a selected gear reducer (in the presently preferred exemplary emobodiment, the gear reducer 20 driving the shear and feeder plunger mechanism 22). The single variable is designated T, the time desired for the completion of a full machine cycle.

In the presently preferred exemplary embodiment, the parameters $P_D$, $P_T$ and $P_R$ are determined as follows:

$$P_D = (F \times T)/(Q \times R) \tag{1}$$

$$P_T = (Q \times R)/I \tag{2}$$

$$P_R = I \tag{3}$$

Although the drive signal is derived from the time base signal, the timing signal is derived from the drive signal, and the reference signal is derived from the timing signal in the presently preferred exemplary embodiment, it is to be understood that these are not the exclusive methods by which the signals may be derived. For example, the present invention also contemplates deriving all three signals directly from the time base signal pulses, in which case the following equations would apply:

$$P_D = (F \times T)/(Q \times R) \tag{4}$$

$$P_T = (F \times T)/I \tag{5}$$

$$P_R = (F \times T) \tag{6}$$

Other equivalent derivations are possible as should be apparent.

As shown in FIG. 2, generator 14 executes an initialization step 50 whereby all registers and the constants F, I, Q and R are initialized. The initialization step 50 is followed by an acquisition step 52, in which a value for the parameter T is acquired. Following the acquisition step 52, the values for the parameters $P_D$, $P_T$ and $P_R$ are calculated in a calculation step 54. In the preferred exemplary embodiment, equations (1), (2), and (3) are used.

Once the calculation step 54 is executed, the drive signal, the timing signal and the reference signal are generated. The generator 14 waits until a time base pulse is received, as indicated by the decision step 56. Once a time base pulse is received, the time base pulse count is incremented by one, as indicated by the process step 58, and the number of counted time base pulses is compared to the value of parameter $P_D$, as indicated by a decisional step 60. If no equality is found, the microprocessor again waits until a time base pulse is received, as indicated by the return arrow to step 56. If the time base pulse count is equal to $P_D$, however, a drive pulse is generated, as indicated by a process step 62; the time base pulse count is initialized, as indicated by a process step 64, and the drive pulse count is incremented by 1, as indicated by a process step 66. The drive pulse count is compared to the value of the parameter $P_T$, as indicated by a decisional step 68. If no equality is found, the microprocessor again waits for a time base signal pulse, as indicated by the return arrow to step 56. If the drive pulse count is equal to $P_T$, however, a timing pulse is generated, as indicated by a process step 70; the drive pulse count is initialized, as indicated by a process step 72; and the timing pulse count is incremented, as indicated by a process step 74. The timing pulse count is then compared to the value of the parameter $P_R$, as indicated by a decisional step 76. If no equality is found, the microprocessor waits for a time base pulse, as indicated by the return arrow step 56. If equality is found, however, a reference pulse is generated, as indicated by a process step 78; the timing pulse count is initialized, as indicated by a process step 80, and the microprocessor waits for a time base pulse, as indicated by the return arrow to step 56. In all the above cases, where a return arrow is directed to the decisional step 56, the microprocessor waits until a time base pulse is received and executes the process step 58 and the subsequent steps as described above. In this way, the drive signal, the timing signal, and the reference are generated.

Typical values for some of the known constants are as follows. Where the stepper motor system 18 requires 200 pulses per revolution, and the gear reducer 20 has a 18:1 ratio gear box, each machine cycle would require 3,600 drive pulses. Where I has the value of 360 degree intervals per machine cycle, ten drive pulses are counterd before a timing pulse is generated, and 360 timing pulses are counted before a reference pulse is generated.

Figure 3:
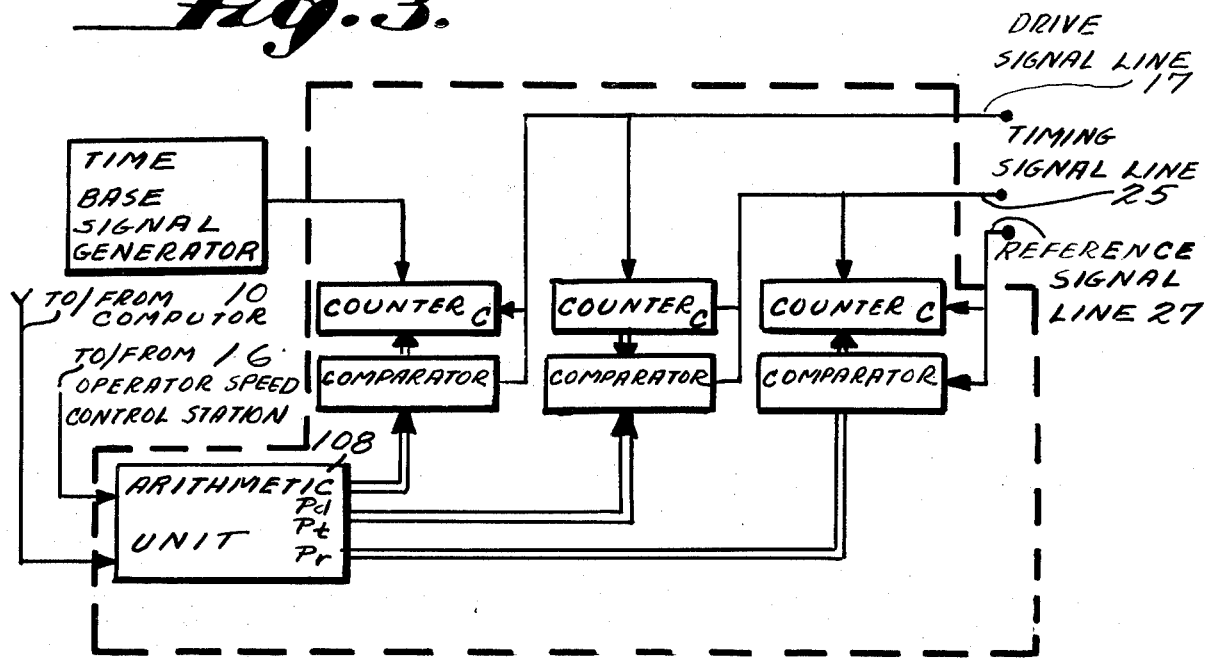
FIG. 3 is of a programmable control signal generator a block diagram of a first exemplary embodiment suitable for use in the control system of FIG. 1.
Figure 4:
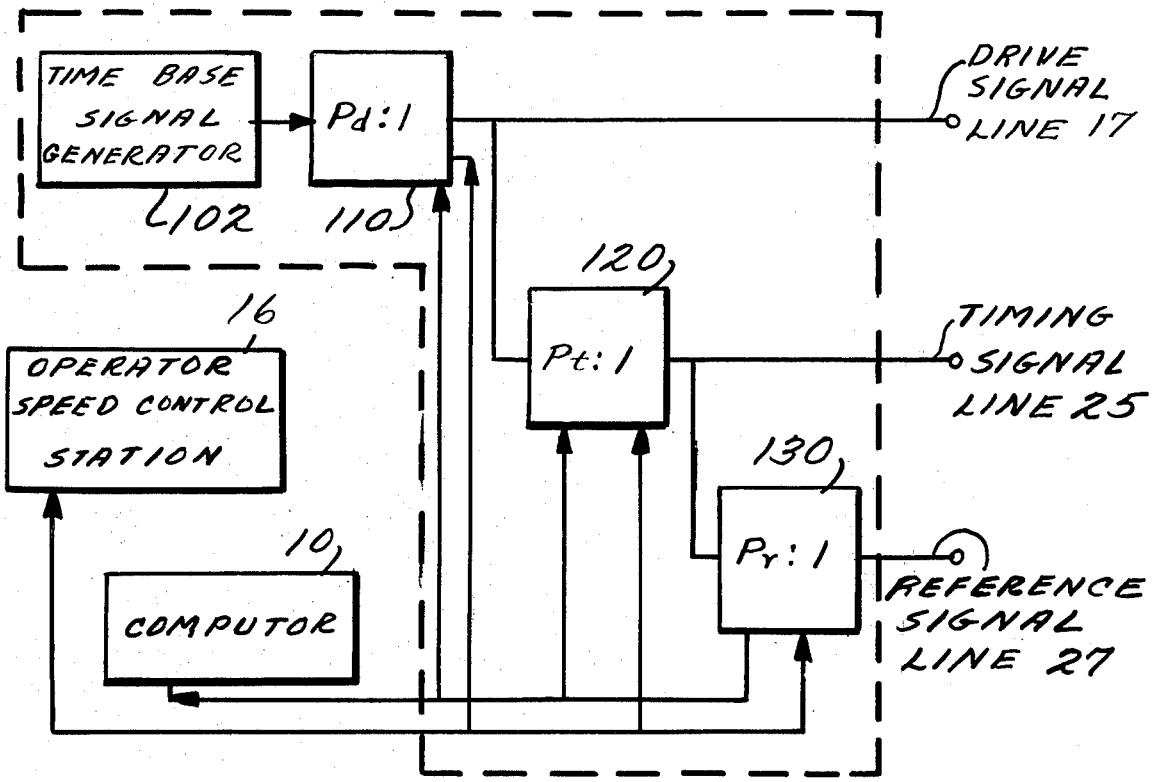
FIG. 4 is of a programmable control signal generator a block diagram of a second exemplary embodiment suitable for use in the control system of FIG. 1.

Exemplary hardware embodiments are shown in FIG. 3 and FIG. 4. In FIG. 3, the generator 14' is a programmable microprocessor comprising a time base signal generator 102 which is programmed to effect the operations represented by a computer logic circuit 100. As shown, an arithmetic unit 108 provides values for the parameters $P_D$, $P_T$ and $P_R$ to respective comparators 106(1), 106(2), and 106(3). The values of the parameters $P_D$, $P_T$ and $P_R$ are established according to equations (1), (2) and (3), the constant and variable values thereof being provided by computer 10 and station 16 (see FIG. 1). The time base signal generator 102 drives a counter 104(1), the output of which is compared to the value of $P_D$ in the comparator 106(1). When a match occurs, a pulse is provided at the output of the comparator 106(1) and supplied as a drive signal to the drive signal line 17. The output of comparator 106(1) is also applied to a clear ("C") input of the counter 104(1) to reset the counter 104(1).

Counter 104(2) receives the drive signal provided at the output of the comparator 106(1) to count the number of drive pulses. The output of the counter 104(2) is compared to the value of the parameter $P_T$ in the comparator 106(2). When a match occurs, a pulse is provided at the output of the comparator 106(2) and supplied as a timing signal to the timing signal line 25. The output of the comparator 106(2) is also applied to a "C" input of the counter 104(2) to reset the counter 104(2).

Counter 104(3) receives the timing signal provided at the output of the comparator 106(2) to count the number of timing pulses. The output of the counter 104(3) is compared to the value of the parameter $P_R$ in the comparator 106(3). When a match occurs, a pulse is provided at the output of the comparator 106(3) and supplied as the reference signal to the reference signal line 27. The output of the comparator 106(3) is also supplied to a "C" input of the counter 104(3) to reset the counter 104(3).

In the exemplary embodiment of FIG. 3, it will be appreciated that the combination of the counter 104(1) and the comparator 106(1) can be viewed as a ratio counter having the ratio $P_D:1$. Similarly, the combination of the counter 104(2) and the comparator 106(2) can be seen as the ratio counter $P_T:1$. Similarly, the combination of the counter 104(3) and the comparator 106(3) can be viewed as a the ratio counter $P_R:1$. Such an exemplary embodiment is shown in FIG. 4, where a generator 14" comprises a $P_D:1$ counter 110, a $P_T:1$ counter 120, and a $P_R:1$ counter 130. The values of the parameters $P_D$, $P_T$ and $P_R$ are determined by the counters 110, 120, and 130 respectively according to equations (1), (2) and (3) respectively, the constant and variable values thereof being provided by computer 10 and station 16. A time base signal generator 102 provides a time base signal to the $P_D:1$ counter 110.

While the present invention has been described in connection with what is presently thought to be the most practical and preferred exemplary embodiments, and in connection with several exemplary embodiments, it is to be understood that the present invention is not limited to such disclosed embodiments but, rather, is intended to cover all modifications and/or equivalent arrangements included within the spirit and scope of the appended claims. For example, the various timing signals may be separately derived from a common time base signal using independent channels of circuit components which are, of course, nevertheless still mutually synchronized by the common time base input. Accordingly, all such variations and modifications are intended to be within the scope of the following claims.

What is claimed is:

1. A glassware forming machine system having a plurality of machine sections, each section having an associated section controller responsive to a timing signal for controlling sequential functions of its associated section and responsive to a reference signal for beginning each repetitive cycle of said sequential functions at a desired relative phase angle therewith and mechanisms performing operations common to said individual sections comprising:
    first means providing values for a plurality of parameters;
    second means for providing an independently generated pulse train and for deriving a variable rate, pulse drive signal, said timing signal, and said reference signal from said independently generated pulse train, said drive, timing, and reference signals having mutually coordinated frequency and phase as determined by said parameter values; and
    a digitally responsive motor to drive said section mechanisms at a variable speed determined from the pulse drive signal generated by said second means, said section sequence and offset being determined from said timing and reference signals.

2. A system as in claim 1 wherein said second means comprises a microprocessor and its associated means for independently generating a time base pulse train, said microprocessor comprising:
    means for calculating relational information relating said drive, timing, and reference signals to one another in accordance with said parameter values; and
    means for deriving said drive, timing and reference signals from said time base signal in accordance with said relational information.

3. A system as in claim 2 wherein said system includes a shear and feeder plunger mechanism and a conveyor mechanism, said system further comprising:
    a stepper motor system responsive to said pulse drive signal;
    a first gear reducer coupled to said shear and feeder plunger mechanism; and
    a second gear reducer coupled to said conveyor mechanism;
    wherein said stepper motor system is coupled to drive said first and second gear reducers for operating said shear and feeder plunger mechanism and said conveyor mechanism.

4. In a glassware forming machine system including an individual section machine having a plurality of individual sections for cyclically effecting timed sequential glassware forming functions, said individual sections operative in phased relationships with one another; a shear and feeder plunger mechanism; and a conveyor mechanism; the improvement comprising:
    a first gear reducer coupled to drive said shear and feeder plunger mechanism;
    a second gear reducer coupled to drive said conveyor mechanism;
    a stepper motor system coupled to drive said first and second gear reducers;
    a plurality of section timing controllers, each coupled to an associated individual section;
    a programmable control signal generator coupled to said stepper motor for supplying a drive signal thereto and coupled to each section timing controller for supplying a timing signal and a reference signal thereto; said drive, timing, and reference signals being respective pulse trains;

an operator speed control station coupled to said programmable control signal generator; and a computer coupled to said programmable control signal generator;

said computer providing timing information for said sequential glassware forming functions and phase information for said phase relationships to each section timing controller, and also providing desired values for a plurality of predetermined parameters to said programmable control signal generator;

said operator speed control station also being manually operable to provide values for said parameters to said programmable control signal generator;

and said programmable control signal generator including means for generating said drive signal, said timing signal, and said reference signal in accordance with said provided parameter values.

5. An improvement as in claim 4 wherein said programmable control signal generator comprises:

a clock for generating time base pulses;

an arithmetic unit for determining variables $P_D$, $P_T$ and $P_R$ in accordance with said parameters; said parameters including the pulse repetition rate of said time base pulses (F), the number of intervals per cycle of said cyclically effected time sequential glassware forming functions (I), the number of pulses required to effect one revolution of said stepper motor (Q), the gear ratio of said first gear reducer (R), and the time desired for the completion of a full machine cycle (T); said variable $P_D$ being equal to $(F \times T)/(Q \times R)$; said variable $P_T$ being equal to $(Q \times R)/I$, and said variable $P_R$ being equal to I;

a first counter coupled to said clock and said arithmetic unit for issuing a drive signal pulse after counting $P_D$ pulses;

a second counter coupled to said first counter and said arithmetic unit for issuing a timing signal pulse after counting $P_T$ pulses; and a third counter coupled to said second counter and said arithmetic unit for issuing a reference signal pulse after counting $P_R$ pulses.

6. A method for electronically controlling the speed of at least one individual section glassware forming machine, said individual section machine including a plurality of individual sections, a mechanism for forming and distributing gobs to said individual sections, and a mechanism for conveying formed glassware from said individual sections; each individual section having a plurality of movable components that operate cyclically with a predetermined phase angle delay relative to reference pulses and in a timed sequence relative to timing pulses; said method comprising the steps of:

independently generating said time base pulses;

counting a first number of said time base pulses and deriving drive pulses from said time base pulses in accordance therewith;

supplying said drive pulses to a stepper motor, said stepper motor being coupled through a gear reducer to said gob forming and distributing mechanism and said conveyor mechanism;

counting a second number of said drive pulses and deriving said timing pulses from a drive pulse count in accordance therewith;

supplying said timing pulses to a plurality of individual section controllers, each controller being associated with an individual section and responsive to said timing pulses to actuate said movable components in accordance with said timing information;

counting a third number of said timing pulses and deriving said reference pulses from a timing pulse count in accordance therewith; and supplying said reference pulses to said controllers, each controller being associated with an individual section and responsive to said reference pulse to begin a cycle with a phase angle delay relative to said reference pulses in accordance therewith.

7. A method as in claim 6 further comprising the steps of:

automatically varying said first, second and third number except when;

manually varying said first, second and third numbers.

8. A method for electronically controlling the drive speed of a plural sectioned machine, said drive being digitally responsive, each section thereof performing sequential timed functions in repeating cycles and operating in a phased relationship relative to other sections; said method comprising the steps of:

generating a base pulse train and from said base pulse train three variable rate pulse trains, each such variable rate pulse train being related to the others, the first pulse train having a repetition rate that is derived from the base pulse train, the desired time per cycle and the number of pulses per rotation of the drive, the second pulse train having a repetition rate that is derived from the base pulse rate, the desired time per cycle and the number of control intervals in each cycle, and the third pulse train having a repetition rate that is derived from the base pulse rate and the desired time per cycle, controlling motor speed by a first pulse train, controlling said timed functions relative to a second pulse train, and controlling said phased relationship relative to a third pulse train.

9. A method as in claim 8 further comprising the steps of:

automatically supplying and varying the relative frequencies of said first, second and third pulse trains except when manually supplying and varying the relative frequencies of said first, second and third pulse trains.

10. A method as in claim 9 wherein said motor is a stepper motor coupled through a gear reducer to a mechanism cooperative with all the sections of said plural sectioned machine; wherein the repetition rate of said base pulse train (F), the number of degree intervals in said repeating cycles (I), the number of pulses required to effect a revolution of said stepper motor (Q), the gear ratio of said gear reducer (R), and the time desired for completion of an operating cycle (T) determines the variables $P_D$, $P_T$, and $P_R$ in accordance with the equation $P_D = (F \times T)/(Q \times R)$ relating said base pulse train and said first pulse train to one another; the equation $P_T = (Q \times R)/I$ relating said first pulse train and said second pulse train to one another; and the equation $P_R = I$ relating said second pulse train and said third pulse train to one another; and wherein said step of deriving pulse trains comprises the steps of:

generating said first pulse train at a pulse repetition rate equal to a fraction $1/P_D$ of the pulse repetition rate of said base pulse train and coordinated therewith;

generating said second pulse train at a pulse repetition rate equal to a fraction $1/P_T$ of the pulse repetition rate of said first pulse train and coordinated therewith; and generating said third pulse train at a pulse repetition rate equal to a fraction $1/P_R$ of the pulse repetition rate of said second pulse train and coordinated therewith.

11. A programmable system for controlling the operating speed of a plural sectioned glass-forming machine and coordinating timed sequential functions of a plurality of cyclically operative sections thereof with said operating speed of the machine and with one another in phased relationships; said programmable system comprising means for providing first information indicative of a desired speed of operation of said glass-forming machine;

a plurality of controllers, each controller being associated with a section; and an information processor responsive to said first information and to second information indicative of the sequence and offset characteristics of said sections of said plural sectioned machine for deriving a speed control signal and coordinating signals from an independently generated time base signal, said speed control signal being effective to control the operating speed of said plural sectioned glass-forming machine and said coordinating signals being provided to said controllers and effective to control the timing of said timed sequential functions and said phased relationships for coordinating said timed sequential functions of said sections.

12. A programmable system as in claim 11 wherein said coordinating signals include a timing signal for timing said timed sequential functions and a reference signal for establishing said phased relationships.

13. A programmable system as in claim 12 wherein said first information providing means comprises a computer for automatically providing said first information and a terminal for manually providing said first information.

14. A programmable system as in claim 13 wherein said speed control signal; said timing signal, and said reference signal are respective pulse trains and further comprising:

a stepper motor driving a gear reducer for controlling the operating speed of said plural sectioned machine in response to said speed control signal;

a clock associated with said processor to provide a time base signal, said time base signal being a pulse train;

said first information including a time selected for completion of operating cycles of said cyclically operative sections (T);

said second information including values for a plurality of parameters, said parameters including the pulse repetition rate of said time base signal (F), the number of intervals in each operating cycle of said cyclically operative sections (I), the number of pulses required to effect one revolution of the stepper motor (Q), and the gear ratio of said gear reducer (R);

said processor further including means for calculating the values of a plurality of variables, said variables including $P_D$, $P_T$ and $P_R$, said variable $P_D$ being equal to $(F \times T)/(Q \times R)$, said variable $P_T$ being equal to $(Q \times R)/I$, and said variable $P_R$ being equal to I;

said processor further including means for determining counts of said time base signal pulses, said speed control signal pulse, and said timing signal pulse; and said processor further including means for generating said speed control signal pulses as a function of said time base signal pulse count and said variable $P_D$; said timing signal as a function of said drive signal pulse count and said variable $P_T$, and said reference signal as a function of said timing signal pulse count and said variable $P_R$.

15. A glassware forming machine system having a plurality of machine sections and a shear and feeder plunger mechanism and a conveyor mechanism common to said machine sections, each section having an associated section controller responsive to a timing signal for controlling sequential functions of its associated section and responsive to a reference signal for beginning each repetitive cycle of said sequential functions at a desired relative phase angle therewith;

first means providing values for a plurality of parameters;

a microprocesser for providing a drive signal, said timing signal, and said reference signal in response to associated means for independently generating a time base signal, said microprocessor having means for calculating relational information relating said drive, timing, and reference signals to one another in accordance with said plurality of parameter values; and means for deriving said drive, timing, and reference signals from said time base signal with coordinated frequency and phase as in accordance with said relational information, a stepper motor system responsive to said drive signal;

a first gear reducer coupled to said shear and feeder plunger mechanism; and a second gear reducer coupled to said conveyor mechanism;

wherein said stepper motor system is coupled to drive said first and second gear reducers for operating said shear and feeder plunger mechanism and said conveyor mechanism.

16. A system as in claim 15 wherein said time base, drive, timing, and reference signals are respective pulse trains and wherein said parameters include the pulse repetition rate of said time base signal (F), the number of intervals in an operating cycle of each individual section (I), the number of pulses required to effect one revolution of said stepper motor system (Q), the gear ratio of said first gear reducer (R), and the time desired for the completion of an operating cycle (T); and said relational information includes the variables $P_D$, $P_T$ and $P_R$, said variable $P_D$ being equal to $(F \times T)/(Q \times R)$, said variable $P_T$ being equal to $(Q \times R)/I$, and said variable $P_R$ being equal to I.

17. A system as in claim 16 wherein said third means comprises:

means for determining the variable $P_D$, $P_T$, and $P_R$ in accordance with said parameters F, I, Q, R and T;

first counting means for counting the pulses of said time base signal and generating a drive signal pulse when $P_D$ time base signal pulses are counted;

second counting means for counting the drive signal pulses and generating a timing signal pulse when $P_T$ drive signal pulses are counted;

third counting means for counting the timing signal pulses and generating a reference signal pulse when $P_R$ timing signal pulses are counted.

18. A system as in claim 17 wherein said first means comprises an operator speed control station for manually providing and varying said parameter values, and a computer for automatically providing and varying said parameter values; said computer further providing initial and updated function timing information and phase information to each section controller; each section controller responding to said timing signal in accordance with said function timing information for controlling said sequential functions and responding to said reference signal in accordance with said phase information for beginning each cycle at the desired relative phase angle.

19. A method for electronically controlling the speed of a stepper motor coupled through a gear reducer to drive a plural sectioned machine, each driven section thereof performing sequential timed functions in repeating cycles and operating in a phased relationship relative to other sections, said method comprising the steps of:
  generating a base pulse train with a repetition rate (F);
  generating a first pulse train at a pulse repetition rate equal to a fraction $1/P_D$ of the pulse repetition rate of said base pulse train and coordinated therewith;
  generating a second pulse train at a pulse repetition rate equal to a fractional $1/P_T$ of the pulse repetition rate of said first pulse train and coordinated therewith;
  generating a third pulse train at a pulse repetition rate equal to a fraction $1/P_R$ of the pulse repetition rate of said second pulse train and coordinated therewith;
  wherein the repetition rate of said pulse train (F), the number of degree intervals in said repeating cycles (I), the number of pulses required to effect a revolution of said stepper motor (Q), the gear ratio of said gear reducer (R), and the time desired for completion of an operating cycle (T) determines the variables $P_D$, $P_T$, and $P_R$ in accordance with the equation $P_D = (F \times T)/(Q \times R)$ relating said base pulse train and said first pulse train to one another; the equation $P_T = (Q \times R)/I$ relating said first pulse train and said second pulse train to one another; and the equation $P_R = I$ relating said second pulse train and said third pulse train to one another;
  controlling motor speed by said first pulse train;
  controlling said timed functions by said second pulse train,
  controlling said phased relationship by said third pulse train; and
  automatically supplying and varying the relative frequencies of said first, second, and third pulse trains except when
  manually supplying and varying the relative frequencies of said first, second, and third pulse trains.

20. A programmable system for controlling the operating speed of a plural sectioned machine and coordinating timed sequential functions of a plurality of cyclically operative sections thereof with said operating speed of the machine and with one another in phased relationships, said programmable system comprising:
  a computer for automatically providing first information indicative of a desired speed of operation of said plural sectional mechanism and a terminal for manually providing said first information;
  a plurality of controllers, each controller being associated with a section; and
  an information processor responsive to said first information and to supplied second information indicative of predetermined characteristics of said system and said plural sectional machine for deriving from an independently generated time base signal pulse trains corresponding to a speed control signal;
  a timing signal for timing said timed sequential functions and a reference signal for establishing said phased relationships, said processor including a clock to provide a pulse train as said independently generated time base signal;
  a stepper motor driving a gear reducer for controlling the operating speed of said plural sectioned machine in response to said speed control signal;
  said first information including a time selected for completion of operating cycles of said cyclically operative sections (T);
  said second information including values for a plurality of parameters, said parameters including the pulse repetition rate of said time base signal (F), the number of intervals in each operating cycle of said cyclically operative sections (I), the number of pulses required to effect one revolution of the stepped motor (Q), and the gear ratio of said gear reducer (R);
  said processor further including means for calculating the values of a plurality of variables, said variables including $P_D$, $P_T$, and $P_R$, said variable $P_D$ being equal to $(F \times T)/(Q \times R)$, said variable $P_T$ being equal to $(Q \times R)/I$, and said variable $P_R$ being equal to I;
  said processor further including means for determining counts of said time base signal pulses, said speed control signal pulse, and said timing signal pulse; and
  said processor further including means for generating said speed control signal pulses as a function of said time base signal pulse count and said variable $P_D$, said timing signal as a function of said drive signal pulse count and said variable $P_T$, and said reference signal as a function of said timing signal pulse count and said variable $P_R$.

21. A method for electronically controlling the speed of operation of a plural sectioned machine, each section thereof performing sequential timed functions in repeating cycles and operating in a phased relationship relative to other sections and being driven from a digitally responsive drive, said method comprising the steps of:
  generating a base pulse train with a repetition rate (F);
  generating a first pulse train at a variable pulse repetition rate equal to a fraction $1/P_D$ of the pulse repetition rate of said base pulse train and coordinated therewith;
  generating a second pulse train at a variable pulse repetition rate equal to a fraction $1/P_T$ of the pulse repetition rate of said first pulse train and coordinated therewith;
  generating a third pulse train at a variable pulse repetition rate equal to a fraction $1/P_R$ of the pulse repetition rate of said second pulse train and coordinated therewith;

wherein the repetition rate of said base pulse train (F), the number of intervals in said repeating cycles (I), the number of pulses required to effect a revolution of said drive (Q×R), and the time desired for completion of an operating cycle (T) determines the variables $P_D$, $P_T$, and $P_R$ in accordance with the equation $P_D=(F\times T)/(Q\times R)$ relating said base pulse train and said first pulse train to one another; the equation $P_T=9Q\times R)/I$ relating said first pulse train and said second pulse train to one another, and the equation $P_R=I$ relating said second pulse train and said third pulse train to one another;

controlling drive speed by said first pulse train;

controlling said timed functions by said second pulse train; and controlling said phased relationship by said third pulse train.

* * * * *

UNITED STATES PATENT AND TRADEMARK OFFICE
CERTIFICATE OF CORRECTION

PATENT NO. : 4,382,810

DATED : MAY 10, 1983

INVENTOR(S) : CHARLES L. WOOD

It is certified that error appears in the above-identified patent and that said Letters Patent is hereby corrected as shown below:

Col. 1, in line 40, delete "to" and insert --is-- therefor; line 49, delete "include" and insert --includes-- therefor.

Col. 2, in line 11, delete "synchornized" and insert --synchronized-- therefor.

Col. 4, in line 58, delete "Kwiatkokwski" and insert --Kwiatkowski-- therefor.

Col. 6, in line 63, delete "terd" and insert --ted-- therefor.

Col. 7, in line 42, delete "a".

Col. 13, lines 27-28 or Claim 19, lines 11-12, delete italics and insert regular print therefor.

Col. 15, line 9, or Claim 21, line 29, delete "9" and insert --(-- therefor.

Signed and Sealed this

Seventh Day of February 1984

[SEAL]

Attest:

GERALD J. MOSSINGHOFF

Attesting Officer    Commissioner of Patents and Trademarks